(12) United States Patent
LeGrange et al.

(10) Patent No.: US 11,038,593 B2
(45) Date of Patent: *Jun. 15, 2021

(54) FREE SPACE OPTICAL COMMUNICATION SYSTEM AND METHOD

(71) Applicant: CACI, Inc.-Federal, Arlington, VA (US)

(72) Inventors: Jane Deborah LeGrange, Princeton, NJ (US); Inuk Kang, Holmdel, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/856,479

(22) Filed: Apr. 23, 2020

(65) Prior Publication Data
US 2020/0252130 A1    Aug. 6, 2020

Related U.S. Application Data

(63) Continuation of application No. 15/390,079, filed on Dec. 23, 2016, now Pat. No. 10,673,530.

(60) Provisional application No. 62/404,316, filed on Oct. 5, 2016.

(51) Int. Cl.
| | | |
|---|---|---|
| *H04B 10/118* | (2013.01) | |
| *H04B 10/112* | (2013.01) | |
| *H04B 10/293* | (2013.01) | |
| *H04B 10/11* | (2013.01) | |

(52) U.S. Cl.
CPC ......... *H04B 10/293* (2013.01); *H04B 10/118* (2013.01); *H04B 10/11* (2013.01); *H04B 10/1121* (2013.01)

(58) Field of Classification Search
None
See application file for complete search history.

(56) References Cited

U.S. PATENT DOCUMENTS

| | | | |
|---|---|---|---|
| 5,177,633 A * | 1/1993 | Wong | G01J 9/04 356/484 |
| 5,321,707 A | 6/1994 | Huber | |
| 5,721,637 A | 2/1998 | Simon et al. | |
| 6,304,348 B1 | 10/2001 | Watanabe | |
| 6,856,456 B2 | 2/2005 | Hildebrand | |
| 6,912,075 B1 * | 6/2005 | Ionov | H04B 10/118 398/121 |
| 7,009,705 B1 | 3/2006 | Dobbs et al. | |
| 8,912,475 B2 | 12/2014 | Smith et al. | |

(Continued)

OTHER PUBLICATIONS

Olsson et al., Injection locking-based pump recovery for phase-sensitive amplified links, 2013 OSA (Year: 2013).*

(Continued)

*Primary Examiner* — Jai M Lee
(74) *Attorney, Agent, or Firm* — BakerHostetler

(57) ABSTRACT

A free-space optical communication method is provided. An example method may include generating an optical frequency comb comprising a first tone and a second tone different from the first tone. The method may include modulating, by a first modulator of a first device, the first tone to generate a first signal comprising data. The method may include modulating, by a second modulator of the first device, the second tone to generate a second signal that is a phase conjugate of the first signal. The method may include transmitting, via free-space and to a second device, a communication signal having the first signal and the second signal.

20 Claims, 9 Drawing Sheets

(56) References Cited

U.S. PATENT DOCUMENTS

| | | |
|---|---|---|
| 8,917,444 B2 | 12/2014 | Li et al. |
| 8,922,874 B2 | 12/2014 | Inafune et al. |
| 9,000,347 B2 | 4/2015 | Woodward et al. |
| 9,002,151 B2 | 4/2015 | Woodward et al. |
| 9,065,243 B2 | 6/2015 | Asobe et al. |
| 9,264,147 B2 | 2/2016 | Caplan et al. |
| 10,514,587 B2* | 12/2019 | Sakamoto ................. G02F 2/02 |
| 10,536,218 B2* | 1/2020 | Andrekson ........... H04B 10/504 |
| 10,673,530 B2* | 6/2020 | LeGrange ............ H04B 10/293 |
| 2003/0152346 A1 | 8/2003 | Aso et al. |
| 2004/0042060 A1* | 3/2004 | McKinstrie ............. G02F 1/395 |
| | | 359/330 |
| 2004/0081470 A1* | 4/2004 | Griffin ............... H04B 10/5561 |
| | | 398/188 |
| 2005/0018724 A1 | 1/2005 | Da et al. |
| 2005/0111499 A1 | 5/2005 | Tanaka |
| 2005/0129412 A1 | 6/2005 | Centanni et al. |
| 2007/0166048 A1* | 7/2007 | Doerr .................... H04J 14/025 |
| | | 398/158 |
| 2007/0230518 A1 | 10/2007 | Watanabe |
| 2008/0130097 A1 | 6/2008 | McKinstrie |
| 2008/0165412 A1 | 7/2008 | Watanabe |
| 2008/0212974 A1 | 9/2008 | Davies et al. |
| 2009/0067843 A1* | 3/2009 | Way .................... H04L 27/2096 |
| | | 398/79 |
| 2009/0202254 A1* | 8/2009 | Majumdar ......... H04B 10/1123 |
| | | 398/140 |
| 2011/0229150 A1 | 9/2011 | Nishihara et al. |
| 2011/0293273 A1 | 12/2011 | Futami |
| 2012/0230694 A1* | 9/2012 | Tanaka ................ H04J 14/0298 |
| | | 398/79 |
| 2013/0051807 A1 | 2/2013 | Huang et al. |
| 2013/0089333 A1 | 4/2013 | Shen |
| 2013/0107351 A1 | 5/2013 | Clowes et al. |
| 2013/0128341 A1 | 5/2013 | Ellis et al. |
| 2013/0202303 A1* | 8/2013 | Wilkinson .......... H04L 27/2697 |
| | | 398/76 |
| 2013/0208334 A1 | 8/2013 | Kakande et al. |
| 2013/0294777 A1* | 11/2013 | Willner .............. H04B 10/5161 |
| | | 398/78 |
| 2014/0185125 A1* | 7/2014 | Kanter .................. G02F 1/3517 |
| | | 359/279 |
| 2014/0233957 A1 | 8/2014 | Watanabe |
| 2016/0261088 A1 | 9/2016 | Akasaka et al. |
| 2017/0019178 A1* | 1/2017 | Alic ........................ H04J 14/02 |
| 2017/0041074 A1 | 2/2017 | Wang et al. |
| 2017/0222721 A1* | 8/2017 | Dailey ............. H04B 10/25752 |
| 2018/0083599 A1* | 3/2018 | Kippenberg ......... H03H 9/2431 |
| 2019/0207679 A1* | 7/2019 | Andrekson .......... H04B 10/112 |

OTHER PUBLICATIONS

Medhi, Von Neumann Architecture, 2012 (Year: 2012).*
Husakou et al., Frequency comb generation by four-wave mixing in a multicore photonic crystal fiber, 2003, AIP Publishing, pp. 3867-3869 (Year: 2003).
Olsson et al., Injection locking-based pump recovery for phase-sensitive amplified links, 2013, OSA, pp. 14512-14529 (Year: 2013).
Rajput, R. K., Basic Electrical and Electronics Engineering, 2006, Firewall Media, pp. 640-641 (Year: 2006).
Wikipedia, Arrayed waveguide grating, 2015 (Year: 2015).
Wikipedia, Optical parametric amplifier, 2015 (Year: 2015).
Wikipedia, Optical Parametric oscillator, Sep. 2015.

* cited by examiner

FREE SPACE OPTICAL COMMUNICATION SYSTEM AND METHOD

CROSS-REFERENCE TO RELATED APPLICATION

This patent application is a continuation U.S. patent application Ser. No. 15/390,079 filed Dec. 23, 2016, which claims the benefit of the priority filing date of the Provisional Application No. 62/404,316, entitled "SYSTEMS FOR LASER COMMUNICATIONS," filed Oct. 5, 2016, each of which are hereby incorporated by reference in their entirety for any and all purposes.

FIELD

The present application generally relates to communication systems and methods, and particularly to a free-space optical communication system and method.

BACKGROUND

Interest in free-space communications is increasing, driven by a market potential for communications access in places where traditional communication infrastructure (wired or wireless) is limited, or is difficult to implement (e.g., due to unfavorable geographical terrains). For example, broadband communications for Internet requires transmitting large data sets. The current solution for broadband communications between satellites and between satellites and Earth is radio frequency (RF) communications. However, RF is limited in bandwidth and limitations are placed on spectrum by government. Further, RF communications requires large beam diameter, and is susceptible to interference, interception, and jamming.

An important parameter associated with implementing conventional satellite communications is the size, weight and power ("SWaP") requirement of the satellite's hardware. For example, it costs USD 5000-10,000 to launch a pound of weight in space. One substantial contributor to the weight of the satellite is the high-power amplifier in the transmitter of the satellite. The high power amplifier is needed to account for losses in transmission of signals from the satellite to a ground based receiver.

Various aspects of this application are directed towards addressing these and other drawbacks and challenges of conventional free-space optical systems and methods with a need to reduce the SWaP requirements.

SUMMARY

This summary is provided to introduce a selection of concepts in a simplified form that are further described below in the Detailed Description. This Summary is not intended to limit the scope of the claimed subject matter. The foregoing needs are met, to a great extent, by the present patent application directed to a system and a method for free space optical communication. The present patent application will be discussed in more detail below.

Methods, devices, systems, and computer readable media are described. An example method may include generating an optical frequency comb comprising a first tone and a second tone different from the first tone. The method may include modulating, by a first modulator of a first device, the first tone to generate a first signal comprising data. The method may include modulating, by a second modulator of the first device, the second tone to generate a second signal that is a phase conjugate of the first signal. The method may include transmitting, via free-space and to a second device, a communication signal having the first signal and the second signal.

An example device may include one or more processors and memory storing instructions that, when executed by the one or more processors, cause the device to: cause output of an optical signal. The optical frequency comb may be generated based on the optical signal. The optical frequency comb may include a first tone and a second tone different from the first tone. The instructions, when executed by one or more processors, may cause the device to modulate, by a first modulator of the device, the first tone to generate a first signal comprising data. The instructions, when executed by one or more processors, may cause the device to modulate, by a second modulator of the device, the second tone to generate a second signal that is a phase conjugate of the first signal. A communication signal comprising the first signal and the second signal may be output via free space.

An example non-transitory computer-readable medium may include computer-readable medium storing computer-executable instructions that, when executed by one or more processors, cause: modulating, by a first modulator of a first device, a first tone to generate a first signal comprising data. The instructions, when executed by one or more processors, may cause modulating, by a second modulator of the first device, the second tone to generate a second signal that is a phase conjugate of the first signal. The first tone and the second tone may be separate tones. The first tone and the second tone may be from an optical frequency comb. A communication signal comprising the first signal and second signal may be transmitted via free space to a second device.

BRIEF DESCRIPTION OF THE DRAWINGS

In order to facilitate a more robust understanding of the patent application, reference is now made to the accompanying drawings, in which like elements are referenced with like numerals. These drawings should not be construed to limit the scope of the application and are for illustrative purposes only.

DETAILED DESCRIPTION

Figure 1:
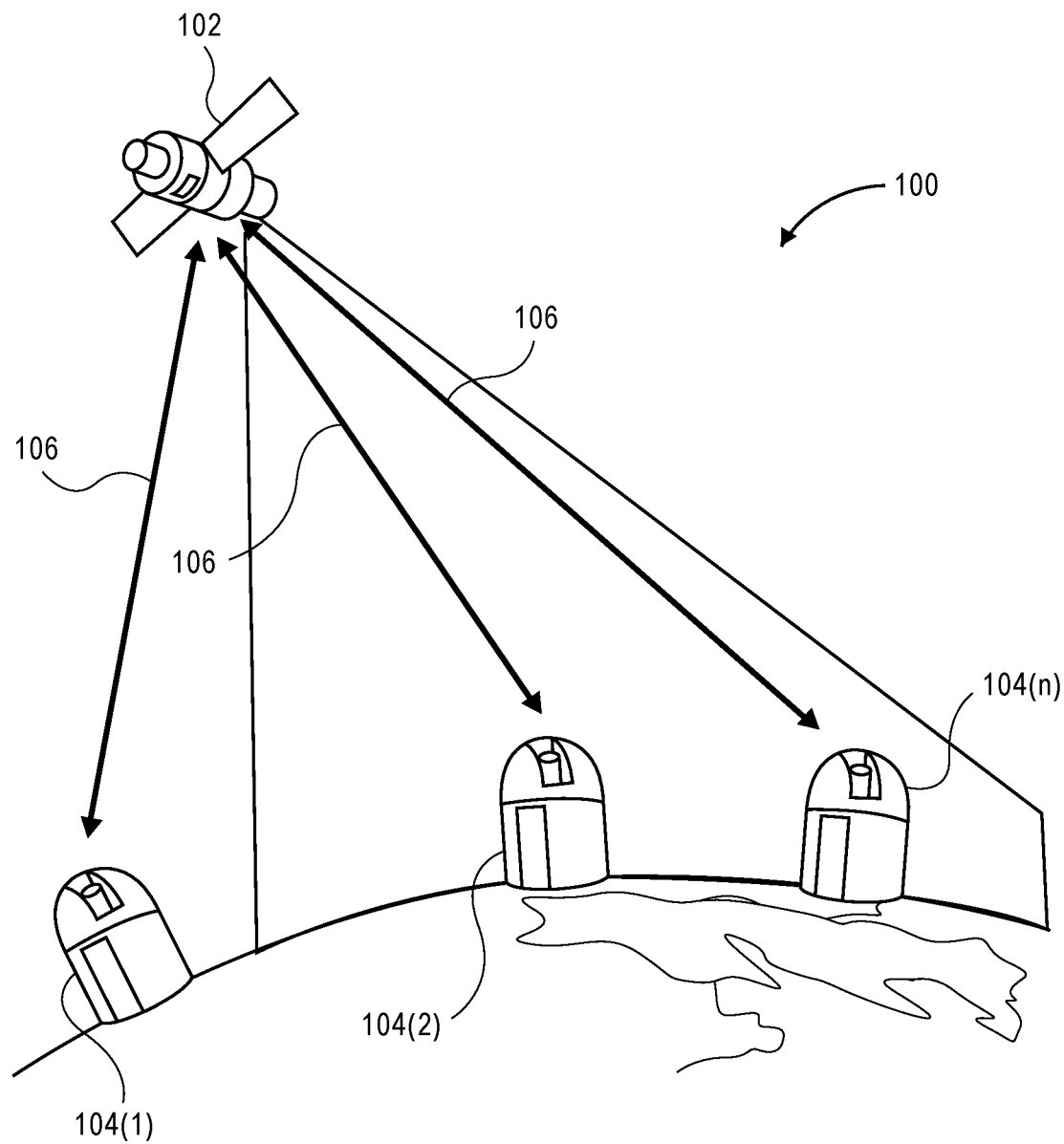
FIG. 1 illustrates an exemplary free-space optical communication system, in accordance with an aspect of this patent application.

Various aspects of this patent application (hereinafter "application") will now be described with reference to the drawing figures, in which like reference numerals refer to like parts throughout. A detailed description of this application is provided in reference to various figures, embodiments and aspects herein. Although this description provides detailed examples of possible implementations, it should be understood that the details are intended to be examples and thus do not limit the scope of the application.

One or more aspects of this application are directed to systems and methods for free-space optical communications. The term "free-space" may apply to optical communications carried out without using optical fibers or optical waveguides as a communication channel. Further, the term "free-space" may include outer space, upper and lower atmosphere, and/or underwater channels, or combinations thereof, over which communication signals are transmitted and/or received without using wires, cables, or optical fibers between a transmission point and a reception point. By way of example only and not by way of limitation, such free-space optical communication may be carried out for a space-to-Earth communication link where a transmission occurs from one or more satellites in space and a reception occurs at any point on Earth that may or may not fall under a satellite's footprint on the Earth. Still by way of example only and not by way of limitation, the free-space optical communication may be a laser-communication at 1550 nm, 950 nm, and/or other suitable optical wavelengths.

Interest in free-space optical communications, e.g., laser communications, from space is exploding, driven by an untapped market for Internet access in places that have limited communications infrastructure. Aspects of this application provide a ground-based receiver with high sensitivity and an energy efficient transmitter on a satellite to address the size, weight and power reduction challenges faced by conventional free-space optical communication systems. Aspects of this application are directed to solving these challenges and other challenges, for example, in providing Internet access in underserved areas of the world using laser communications from a satellite. Further, aspects of this application may be utilized, for example, in deep space exploration, for battlefield military communications, intelligence gathering, surveillance, reconnaissance, and/or for service and content providing.

Referring to FIG. 1, a general architecture of a free-space optical communication system 100 (interchangeably referred to as "system 100") is provided, in accordance with an aspect of this application. The system 100 includes a satellite 102 and a plurality of ground-based receivers 104(1)-104(n), 'n' being an index greater than or equal to one. It will be appreciated that although FIG. 1 illustrates only one satellite 102, the system 100 may include a plurality of satellites, for example, a constellation of satellites to which the satellite 102 belongs. Further, the satellite 102 may communicate with outer space based objects, e.g., other satellites that may or may not be a part of a network with which the satellite 102 is associated. The satellite 102 may be a low-Earth orbiting satellite or a high-altitude deep space satellite (e.g., 700 miles above sea level). Furthermore, instead of or in addition to the satellite 102, the system 100 may include airborne communication systems such as those on unmanned or manned aerial vehicles or devices (e.g., drones).

The satellite 102 is configured to transmit one or more laser signals 106 to one or more of the ground—based receivers 104(1)-104(n) over free-space. Such laser signals 106 may each include one or more communication signals carrying data. The communication signals are then processed by the ground-based receivers 104(1)-104(n) to recover data for terrestrial distribution (e.g., over the Internet). The ground-based receivers 104(1)-104(n) may be standalone independent ground terminals or may be connected to each other via one or more communication networks. Further, the one or more of the ground-based receivers 104(1)-104(n) may be mobile. The communication signals received by one or more of the ground-based receivers 104(1)-104(n) may include noise, and may suffer attenuation, dispersion, interference (e.g., due to reflections) and/or other types of distortions (linear as well as nonlinear) due to traversal through the atmosphere, a water body, clouds, or the like, or combinations thereof.

Figure 2:
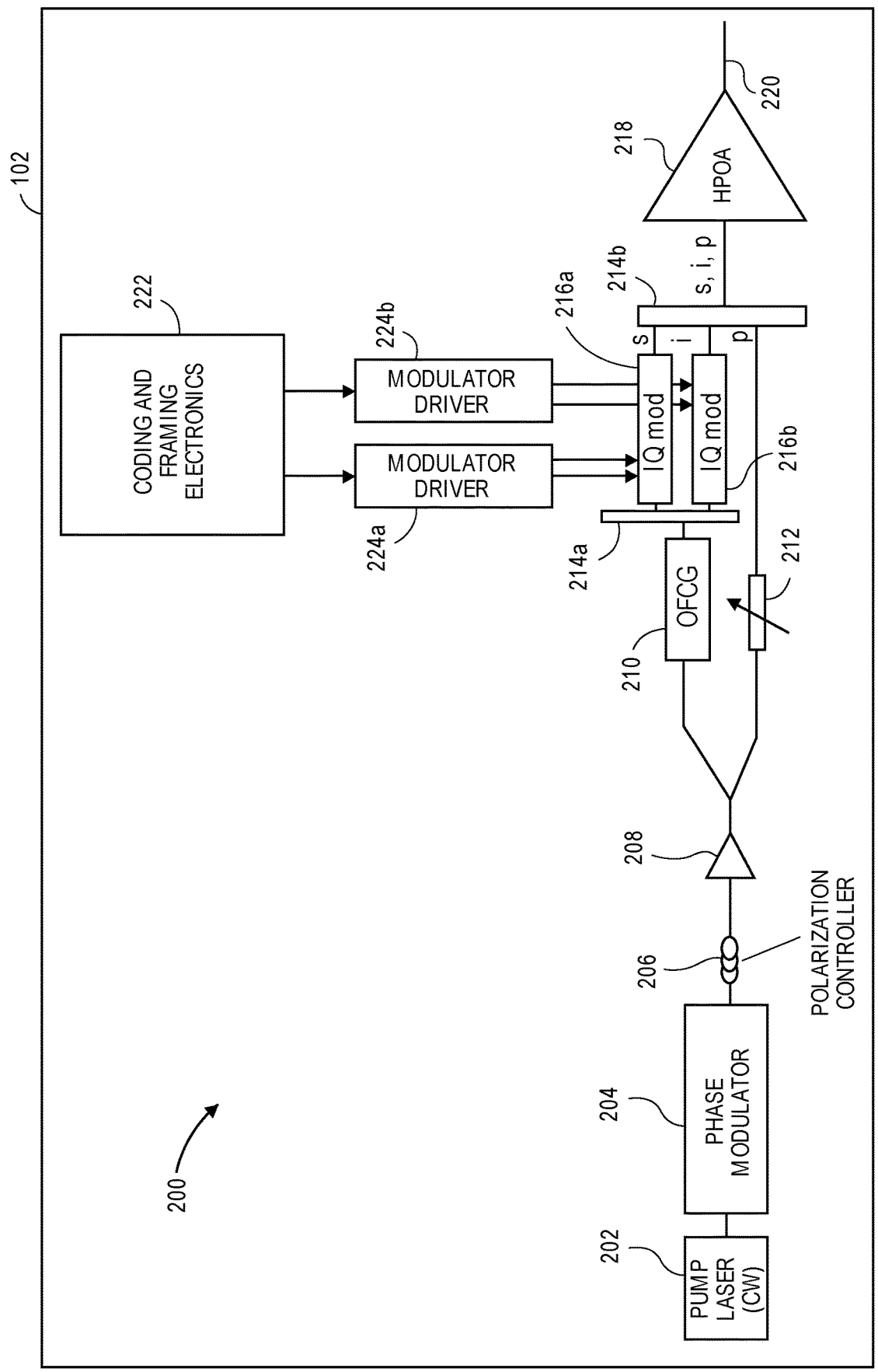
FIG. 2 illustrates a first exemplary implementation for a transmitter in a satellite of the free-space optical communication system of FIG. 1, in accordance with an aspect of this patent application.

Referring to FIG. 2, a first exemplary implementation for a transmitter 200 in the satellite 102 of the free-space optical communication system 100 of FIG. 1 is illustrated, in accordance with an aspect of this patent application. The transmitter 200 includes a pump signal generator 202. The pump signal generator 202 may be a pump laser having a continuous wave output used as a pump signal "p." For example, the pump laser may output a single monochromatic optical signal at a specific wavelength (e.g., 1550 nm). Alternatively, the pump laser output may be used to generate optical signals at two or more different wavelengths, for example using additional optical components and optical setup (e.g., non-linear components). Still alternatively, a second pump wavelength could be created either by two pump lasers or by taking one of the comb wavelengths as a pump wavelength.

Figure 3:
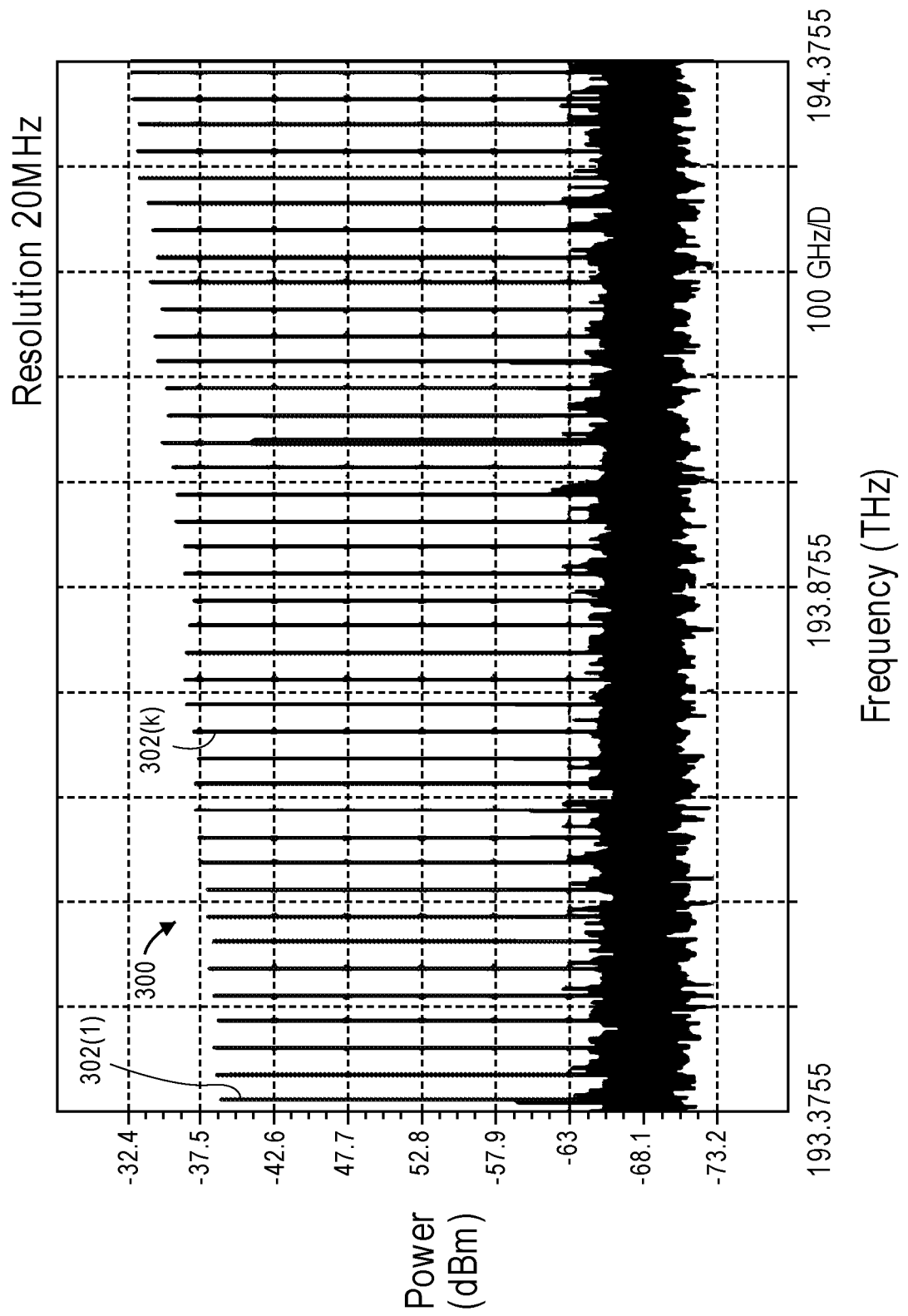
FIG. 3 illustrates an example of optical tones of an optical frequency comb generator in the transmitter of FIG. 2, in accordance with an aspect of this patent application.

In one aspect of this application, the pump signal generator 202 may include only a single laser that is configured as a source for all optical wavelengths in the transmitter 200. Further, this single laser may be matched to one or more lasers in one or more of the ground-based receivers 104(1)-104(n). The same laser in the pump signal generator 202 is used to produce both the seed to generate an optical frequency comb 300 (shown in FIG. 3) and the pump signal "p" for a phase sensitive amplifier in one or more of the ground-based receivers 104(1)-104(n).

Alternatively, the pump signal generator 202 may provide a base wavelength for outputting two pump wavelengths, which may be advantageous in mitigation of phase noise introduced by the frequency broadening needed to reduce stimulated Brillouin scattering (SBS) occurring in the transmitter 200. By way of example only and not by way of limitation, the pump signal generator 202 may output an optical beam at a wavelength of 1550 nm.

The output from the pump signal generator 202 may be provided to a phase modulator 204 in the transmitter 200. The phase modulator 204 is configured to mitigate the stimulated Brillouin scattering.

The transmitter 200 may include a polarization controller 206 coupled to an output of the phase modulator 204. The polarization controller 206 is configured to output the optical beam from the pump signal generator 202 to a fixed polarization state. The fixed polarization state of the pump signal from the pump signal generator 202 is then outputted to an erbium-doped fiber amplifier (EDFA) 208 in the transmitter 200. The EDFA 208 has an output power of 14 dBm (~2 W of electrical power consumption) to set an input power to a required level for an optical frequency comb generator (OFCG) 210 in the transmitter 200, the OFCG 210 being coupled to the EDFA 208. In this sense, the OFCG 210 is operatively coupled to the pump signal generator 202 via the EDFA 208 whose output (amplified pump signal) serves as a source for the OFCG 210.

In one aspect of this application, the output from the EDFA 208 may be split to provide a first portion to the OFCG 210 and a second portion of the pump signal to a variable attenuator 212. By way of example only and not by way of limitation, such a split may be in a 50:50 ratio, or may be in a 90:10 ratio with 90% of the output of the EDFA 208 being provided to the OFCG 210 and the remaining 10% of the pump signal "p" to the variable attenuator 212.

The OFCG 210 is coupled to the EDFA 208 at an input and to a first array waveguide 214a at an output. In one aspect of this application, the OFCG 210 may be a comb source configured to produce the optical frequency comb 300 shown in FIG. 3 (e.g., a 32 nm wide comb), based, for example, on a Lithium Niobate modulator in a Fabry-Perot cavity arrangement (not shown). The optical frequency comb 300 includes optical tones 302(1)-302(k), 'k' being an integer index greater than or equal to two, that are phase synchronized as pairs prior to being input to the first array waveguide 214a.

The first array waveguide 214a is configured to operate upon each of a pair of optical tones (e.g., the optical tones 302(1) and 302(2)) in parallel by acting as a router. A first optical tone output by the first array waveguide 214a is modulated by a first modulator 216a to generate a data signal (indicated as "s" in FIG. 2). In parallel, a second optical tone output by the first array waveguide 214a is modulated by a second modulator 216b to generate an idler signal (indicated as "i" in FIG. 2). The first array waveguide 214a outputs pairs of optical tones (e.g., first and second optical tones 302(1) and 302(2)) from the optical frequency comb 300. In one aspect of this application, the data signal "s" and the idler signal "i" may be at frequencies that are spaced equally from a pump frequency of the pump signal "p."

By way of example only and not by way of limitation, the first modulator 216a and the second modulator 216b may be in-phase/quadrature phase modulators (IQ modulators). In one aspect of the application, the idler signal "i" is a phase conjugate of the data signal "s." That is, a phase of the idler signal "i" is shifted by 90° relative to a phase of the data signal "s." The first modulator 216a and the second modulator 216b may each be respectively coupled to a first modulator driver 224a and a second modulator driver 224b. Each of the first modulator driver 224a and the second modulator driver 224b receives data from coding and framing electronics 222 that may be further coupled to a raw data source, e.g., a database of a computer (not shown) onboard the satellite 102. The data modulation and its phase conjugate are transferred via the first modulator 216a and the second modulator 216b to form the data signal and the idler signal, respectively. Compound modulation formats such as Pulse Position Modulation (PPM) mixed with quadrature phase shift keying (QPSK) may be enabled using the phase conjugation between the idler signal "i" and the data signal "s."

The respective outputs (the data signal "s" and the idler signal "i") of the first modulator 216a and the second modulator 216b are coupled to a second array waveguide 214b. In parallel, the second array waveguide 214b receives the pump signal (indicated as "p") from the pump signal generator 202 via the EDFA 208. The second array waveguide 214b is configured to multiplex the data signal "s", the idler signal "i" and the pump signal "p" after attenuation by the variable attenuator 212. The multiplexed signal including the data signal "s", the idler signal "i" and the pump signal "p" is provided to a high-power optical amplifier (HPOA) 218. The pump signal "p" is at least partially attenuated to minimize its effect on a gain of the HPOA 218 for the data signal "s" and the idler signal "i" wavelengths.

In one aspect of this application, the HPOA 218 is configured to amplify the multiplexed signal and a communication signal 220 for transmission by the satellite 102. The communication signal 220 may be transmitted as the one or more laser signals 106 from the satellite 102 to one or more of the ground-based receivers 104(1)-104(n).

Exemplary advantages of the transmitter 200 design using the optical frequency comb 300 are that the transmitter 200 requires fewer components than conventional transmitters since a single laser is used to produce the data signal "s", the idler signal "i", and the pump signal "p" via the OFCG 210, uses lesser power, and phase synchronization between the data signal "s", the idler signal "i", and the pump signal "p" is simplified.

In one aspect, one or more components of the transmitter 200 may be integrated on a single integrated circuit (IC) chip to reduce size and weight further. For example, an integrated transmitter having a functionality of the transmitter 200 in a silicon photonics platform may be implemented. Further by way of example only and not by way of limitation, the OFCG 210, the first modulator 216a and the second modulator 216b, and the first array waveguide 214a and the second array waveguide 214b could all be integrated on a single chip. Furthermore, optical systems integrated on chip in a variety of material platforms and on hybrid integration of chips fabricated in different materials may be utilized to implement the transmitter 200, thereby reducing the SWaP of the satellite 102.

Figure 4:
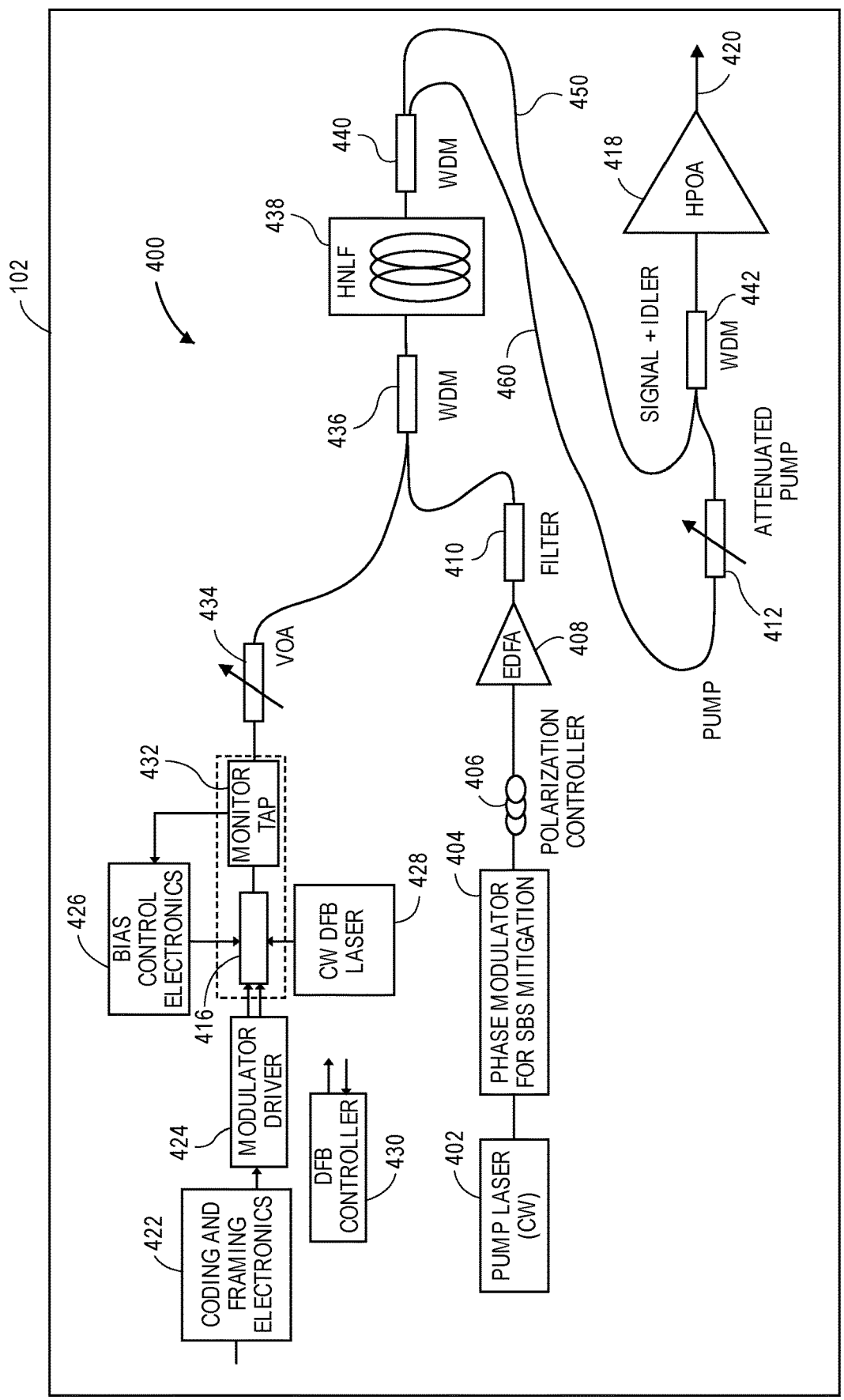
FIG. 4 illustrates a second exemplary implementation for a transmitter in a satellite of the free-space optical communication system of FIG. 1.

Referring now to FIG. 4, a second exemplary implementation for a transmitter 400 in the satellite 102 of the free-space optical communication system 100 of FIG. 1 is illustrated, in accordance with another aspect of this patent application. The transmitter 400 uses a copier-phase sensitive amplifier (PSA) scheme shown in FIG. 5 for a free-space communication environment such as that illustrated for the system 100 in FIG. 1. In the copier-PSA scheme for the system 100 implemented using the transmitter 400, the transmitter 400 can achieve up to 3 dB noise figure improvements over either a conventional phase-insensitive erbium amplifier or an all-phase sensitive amplifier.

Figure 5:
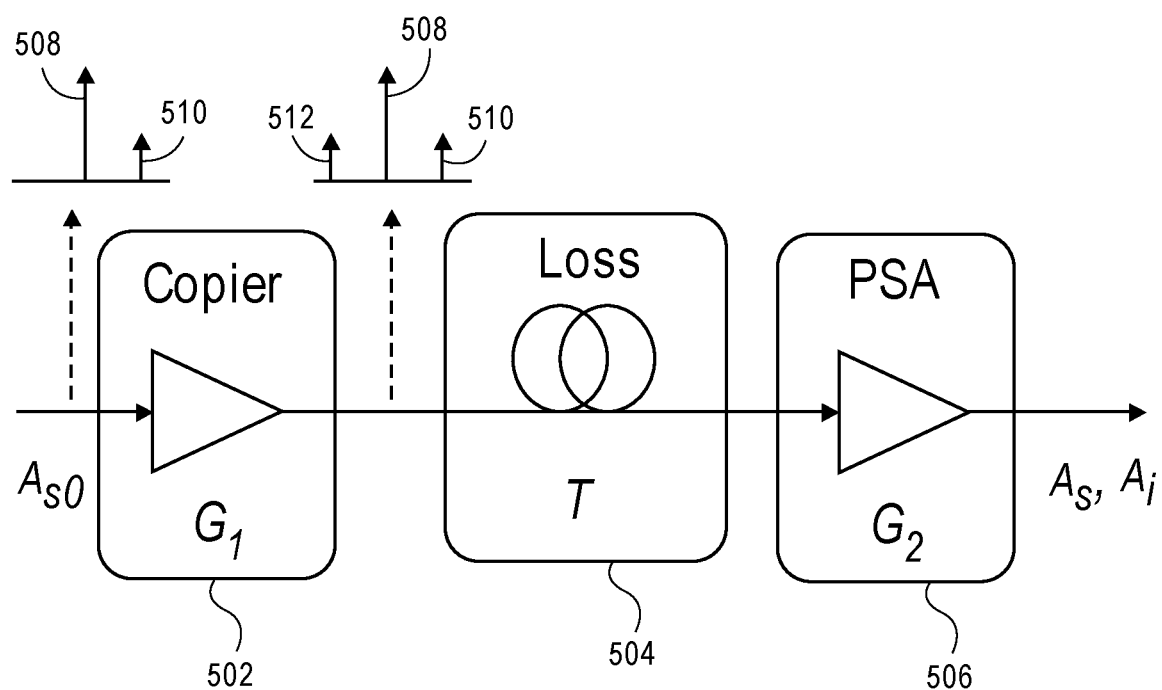
FIG. 5 illustrates a copier-phase sensitive amplifier (PSA) scheme implemented using the transmitter of FIG. 4, in accordance with another aspect of this patent application.

Referring to FIG. 5, a schematic diagram of the copier-PSA technique is illustrated for the transmitter 400, in accordance with an aspect of this application. A copier 502 is a parametric, phase insensitive amplifier (an example of which is a length of a highly nonlinear fiber (HNLF)) that creates a phase conjugate idler signal 512 such that a data signal 508 and the idler signal 512, carrying the same data, are input to a second stage which is a phase sensitive amplifier 506 after a free-space link loss compensation 504 (e.g., to compensate for the loss between the satellite 102 and the ground-based receivers 104(1)-104(n)). The phase conjugate idler signal 512 is what allows this scheme to work with arbitrary modulation formats as data is encoded in both quadratures of the data signal 508.

The copier-PSA scheme for the transmitter 400 is uniquely suited to the free-space optical communications system 100, for which there are no transmission impairments due to dispersion or optical fiber nonlinearities, a feature common with the comb based transmitter 200. In this scheme, noise is attenuated by the free-space link loss compensation 504 to mitigate correlated noise generated by the copier 502 that may dominate the noise figure (NF). It has been proven theoretically that the copier-PSA approach can result in up to a 3 dB reduction in the quantum limit of the NF relative to a conventional phase insensitive amplifier receiver. The 3 dB value is calculated based on using the combined signal having the data signal 508 and the idler signal 512 at an input of the PSA 506. The copier-PSA approach has been demonstrated to have an NF of 1.1 dB measured at 26.5 dB of gain. Because of the phase conjugated idler signal 512 generated in the copier 502, there is no phase squeezing in the phase sensitive amplifier 506 of the transmitter 400, and broadband, arbitrarily modulated data can be amplified using the transmitter 400, and transmitted with the pump signal 510.

Referring back to FIG. 4, the transmitter 400 includes a pump laser 402 (similar to the pump signal generator 202 in the transmitter 200), coupled to a phase modulator 404 (similar to the phase modulator 204 in the transmitter 200), a polarization controller 406 (similar to the polarization controller 206 in the transmitter 200), and an EDFA 408 (similar to the EDFA 208 in the transmitter 200) whose output is provided to a filter 410. The output of the filter 410 is the pump signal 510 (shown in FIG. 5, similar to the pump signal "p" in FIG. 2). An output of the filter 410 is provided to a first wavelength division multiplexer 436.

In parallel, the data signal 508 is provided to the first wavelength division multiplexer 436 in the transmitter 400. The data signal 508 may be generated using coding and framing electronics 422 (similar to the coding and framing electronics 222 of the transmitter 200) coupled to a modulator driver 424 (similar to the modulator drivers 224a/224b). Further, the modulator driver 424 is coupled to a modulator 416 (similar to the modulators 216a and 216b). The modulator 416 may be controlled using bias control electronics 426, a distributed feedback (DFB) laser 428 coupled to a DFB controller 430, and a monitor tap 432. An output of the monitor tap 432 is provided to a variable optical amplifier 434 that is further coupled to the first wavelength division multiplexer 436.

The first wavelength division multiplexer 436 is configured to multiplex the data signal 508, the idler signal 510, and the pump signal 510, and configured to provide them to a parametric amplifier 438 that emulates the copier 502. By way of example only, the parametric amplifier 438 may include a highly nonlinear fiber (HNLF) element for amplifying the data signal 508 and generating the phase conjugate idler signal 512 (e.g., using four-wave mixing).

The pump laser 402 is an amplified continuous wave (CW) source, requiring phase modulation of the pump signal 508 at the phase modulator 404 for mitigation of SBS in the parametric amplifier 438 (e.g., the HNLF). The pump power required at the parametric amplifier 438 is roughly 1 W from the EDFA 408, which has a power consumption of 25 W (~30 dBm), for example.

An output of the parametric amplifier 438 is provided to a second wavelength division demultiplexer 440 that splits the data signal 508 and the idler signal 512 onto a first fiber 450 and the pump signal 510 onto a second fiber 460. The second fiber 460 is coupled to a variable attenuator 412 (similar to the variable attenuator 212 of the transmitter 200).

An output of the first fiber 450 having the data signal 508 and the idler signal 512, and the second fiber 460 having an attenuated version of the pump signal 510 are each provided to a third wavelength division multiplexer 442 to multiplex the attenuated pump signal 510 along with the data signal 508 and the idler signal 512. The pump signal 510 is attenuated by the variable attenuator 412 in order not to rob amplifier gain from the data signal 508 and the idler signal 512.

An output of the third wavelength division multiplexer 442 is provided to a high power optical amplifier 418 (similar to the HPOA 218 of the transmitter 200). In one aspect of this application, the HPOA 418 amplifies the multiplexed signal and to generate a communication signal 420 for transmission by the satellite 102. The communication signal 420 may be transmitted as the one or more laser signals 106 from the satellite 102 to one or more of the ground-based receivers 104(1)-104(n). The laser signals 106 may be transmitted via telescope optics (not shown) in the satellite 102.

The use of a phase sensitive amplifier in one or more of the ground-based receivers 104(1)-104(n) is enabled by the creation of the data signal 508 (or, the data signal "s" in the transmitter 200) and the phase conjugate idler signal 512 (or, the idler signal "i" in the transmitter 200), e.g., generated by the copier 502. The lower noise figure of the one or more of the ground-based receivers 104(1)-104(n) enables the required output power from the HPOA 418 (or, the HPOA 218 in the transmitter 200) to be reduced, thereby reducing size, weight, and power (SWaP) of the satellite 102. However, in comparison to the transmitter 200, the transmitter 400 may require a higher number of components.

Figure 6:
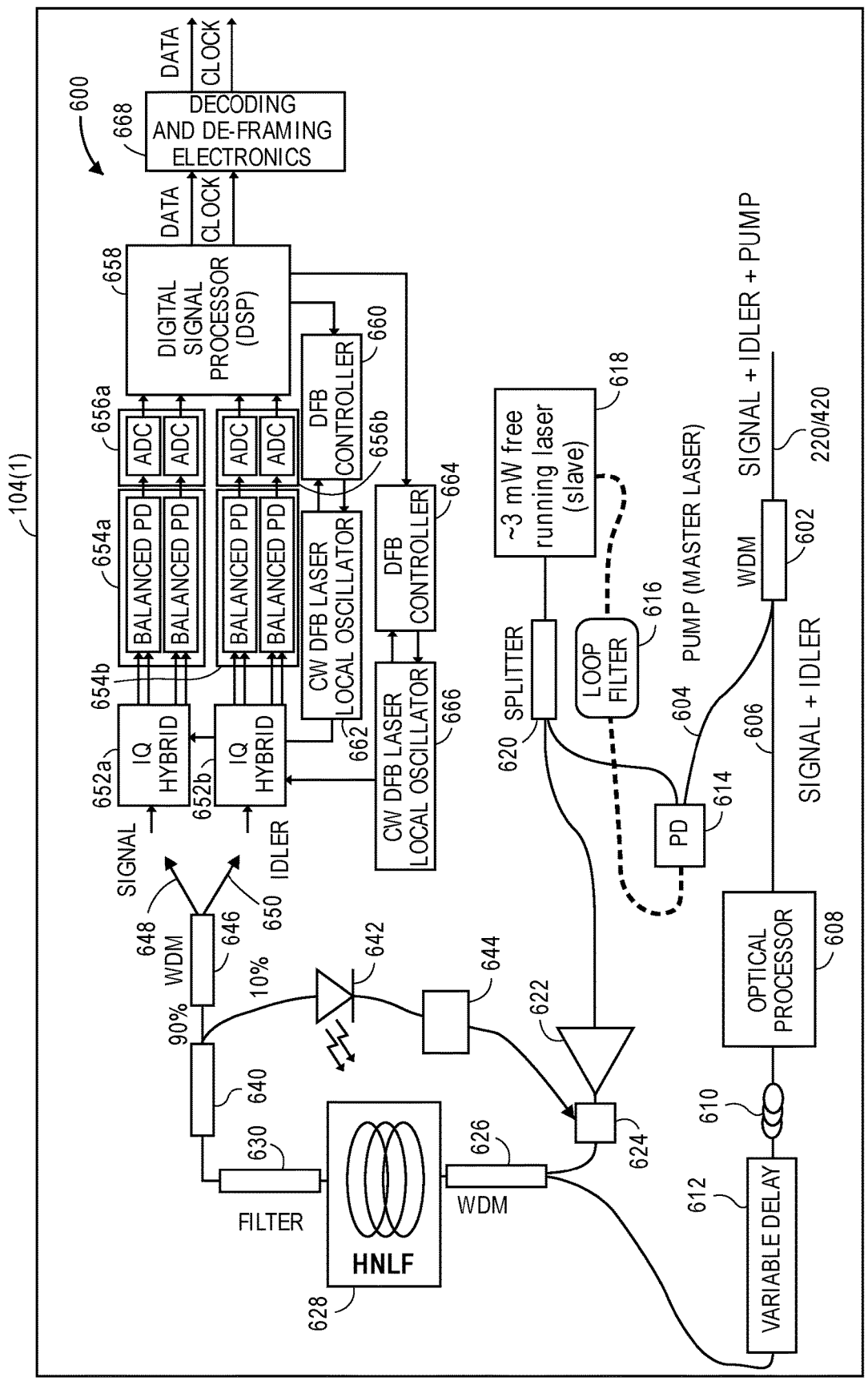
FIG. 6 illustrates an exemplary implementation of a receiver in a ground-station of the free-space optical communication system of FIG. 1, in accordance with an aspect of this patent application.

Referring to FIG. 6, an exemplary implementation of a receiver 600 in one of the ground-based receivers 104(1)-104(n) of the free-space optical communication system 100 of FIG. 1 is illustrated, in accordance with an aspect of this patent application. For example, the receiver 600 may be in the ground-based receiver 104(1).

The receiver 600 may include telescopic optics (not shown) to receive the communication signal 220 and/or the communication signal 420 from the satellite 102. Hereinafter, for FIG. 6, the discussion will refer to the communication signal 220 by way of example only and not by way of limitation. The communication signal 220 is provided to a first splitter 602 (e.g., a wavelength division demultiplexer). A first output 604 of the first splitter 602 includes the pump signal "p" (or, the pump signal 510 as the case might be). A second output 606 of the first splitter 602 includes the data signal "s" (or, the data signal 508 as the case might be) and the idler signal "i" (or, the idler signal 512 as the case might be) combined. In this way, the pump signal "p" associated with the pump laser of the pump signal generator 202 in the transmitter 200 is separated from the data signal "s" and the idler signal "i." The pump signal "p" then serves as a signal associated with a master laser from the satellite 102.

The first output 604 is provided in succession to a photodiode 614, a loop filter 616, a slave laser 618, a second splitter 620 feeding back into the photodiode 614, and an amplifier 622 outputting a frequency stabilized pump signal "p" coupled to a piezoelectric transducer 624. The pump signal "p" is frequency locked to the slave laser 618 and then amplified by the amplifier 622 before being input to a phase sensitive amplifier 628.

The second output 606 is provided to an optical processor 608. The optical processor 608 is configured to adjust or equalize respective amplitudes and phases of the data signal "s" and the idler signal "i." An output of the optical processor 608 is provided to a polarization controller 610 and to a variable delay element 612. The polarization controller 610 is configured to adjust a polarization of the data signal "s" and the idler signal "i" with respect to the pump signal "p." The variable delay element 612 is configured to synchronize optical path lengths of the data signal "s" and the idler signal "i" with that of the pump signal "p." An output of the variable delay element 612 is provided to a first input of a wavelength division multiplexer (WDM) 626. An output of the piezoelectric transducer 624 is provided to a second input of the (WDM) 626. The WDM is configured to combine the data signal "s", the idler signal "i" and the pump signal "p."

An output of the WDM 626 is provided to the phase-sensitive amplifier (PSA) 626. By way of example only and not by way of limitation, the PSA 628 may be a highly nonlinear fiber amplifier. The PSA 628 is coupled at an output to a filter 630. An output of the filter is provided to a coupler 640. The coupler 640 splits an output of the filter 630 for coupling onto a WDM 646 and a photodiode 642. Such a split by the coupler 640 may be, for example, in a 90:10 ratio where 90% of the signal output by the filter 630 is provided to the WDM 646 and 10% is provided to the photodiode 642, although this ratio may be adjusted.

The photodiode 642 provides an electrical signal to a lock-in amplifier 644. The lock-in amplifier 644 is configured to phase—lock the pump signal "p" to the data signal "s" and the idler signal "i." In this sense, the lock-in amplifier 644 carries out at least a part of the pump recovery (e.g., carrying out the phase recovery of the pump), the other part being carried out using the slave laser 618 where in the pump signal "p" or the pump signal 510 is frequency stabilized. The phase-locked pump signal "p" is then coupled back to the piezoelectric transducer 624. The photodiode 642, the lock-in amplifier 644 and the piezoelectric transducer 624 form a feedback loop in the receiver 600.

The WDM 646 has a first output 648 for the data signal "s" and a second output 650 for the idler signal "i." The data signal "s" is then demodulated by a first demodulator 652a coupled at an output to a first set of balanced photodetectors 654a and to a first set of analog-to-digital (ADC) converters 656a. Likewise, the idler signal "i" is demodulated by a second demodulator 652b coupled at an output to a second set of balanced photodetectors 654b and to a second set of analog-to-digital (ADC) converters 656b. By way of example only, the first demodulator 652a and the second demodulator 652b may each be a Hybrid IQ demodulator.

An output of the first set of ADCs 656a is provided to a digital signal processor (DSP) 658. Likewise, an output of the second set of ADCs 656b is provided to the digital signal processor (DSP) 658. The DSP 658 is configured to output data packets and a clock signal and forward it to extract raw data and clock by decoding and de-framing electronics 668. Such raw data and clock may then be provided to a computer system (not shown) for use and/or storage.

The receiver 600 works for both transmitter designs for the transmitter 200 and the transmitter 400. For communications between the satellite 102 and the Earth, a SWaP of the receiver 600 is much less important than the SWaP of the transmitter 200 or the transmitter 400. Various aspects of this application implement a phase sensitive amplifier in the transmitter 200 or the transmitter 400 with reduced noise figure such that a smaller HPOA 218/HPOA 418 could be used in the transmitter 200/the transmitter 400, thereby reducing size, weight, and power for the satellite 102.

As with the transmitter 200 and/or the transmitter 400, the size and weight of the receiver 600 can be reduced dramatically by integration of the components on an integrated circuit (IC) chip. For example, the phase sensitive amplifier 628 of the receiver 600 could be integrated on a silicon chip. A nonlinear silicon device could be used instead of the HNLF in the phase sensitive amplifier 628 for the gain medium, and that could be integrated with the optical phase lock loop or the feedback loop in the receiver 600. The high precision of path lengths facilitated by lithographic definition of optical circuits on an IC chip will simplify the phase locking of the pump signal "p" (or, the pump signal 510) with the data signal "s" and the idler signal "i" (or the data signal 508 and the idler signal 512).

Phase sensitive amplifiers for which the amplification is based on non-linear parametric effects, have a quantum noise limit 3 dB lower than that of commercial, phase insensitive amplifiers, such as erbium doped fiber amplifiers (EDFA). Phase sensitive amplifiers can either be frequency degenerate with identical frequencies for the data signal "s" and the idler signal "i", or nondegenerate with the data signal "s" and the idler signal "i" on different frequencies. Parametric amplification based on four wave mixing produces side bands at a different (idler) frequency. Degenerate amplifiers, which can be implemented in materials with high second or third order nonlinearities ($\chi^2$ or $\chi^3$), are characterized by lower gain and do not have the flexibility required by a WDM system as only one optical wavelength can be amplified per pump wavelength. In contrast, non-degenerate phase sensitive amplifiers, which are based on materials with large nonlinearities, for example, highly nonlinear fibers (HNLF) with large $\chi^3$ or periodically poled lithium niobate waveguides (PPLN) utilizing cascaded $\chi^2$ processes, can achieve exponential gain relative to pump power and simultaneous multichannel amplification. The difficulty is that input signals at different wavelengths must be phase locked. This challenge may be mitigated by electrically modulated sideband generation and parametric idler creation, both of which may avoid the complexity of optical phase-locking systems.

Figure 7:
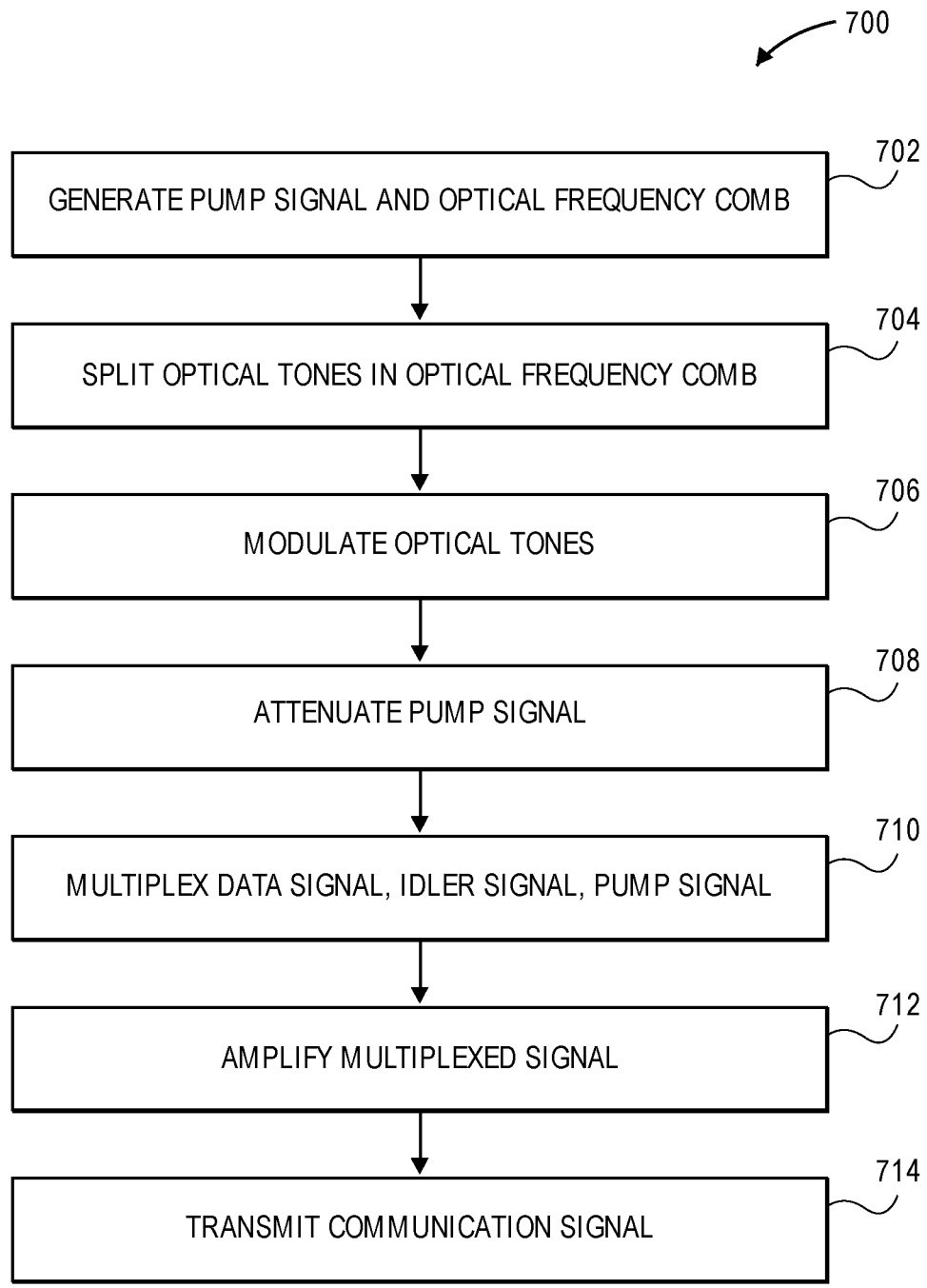
FIG. 7 illustrates a first transmission method, in accordance with an aspect of this patent application.
Figure 8:
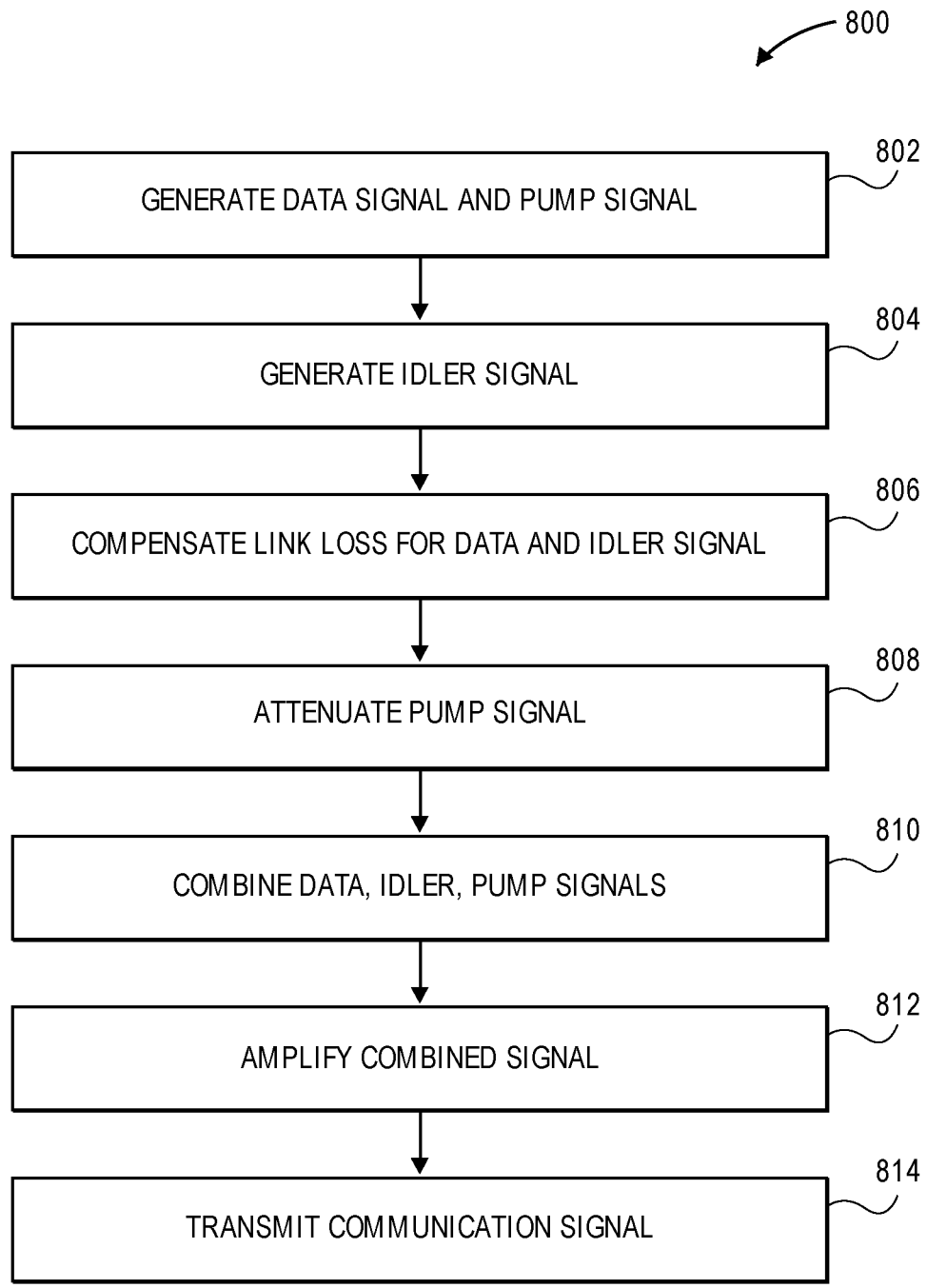
FIG. 8 illustrates a second transmission method, in accordance with another aspect of this patent application.
Figure 9:
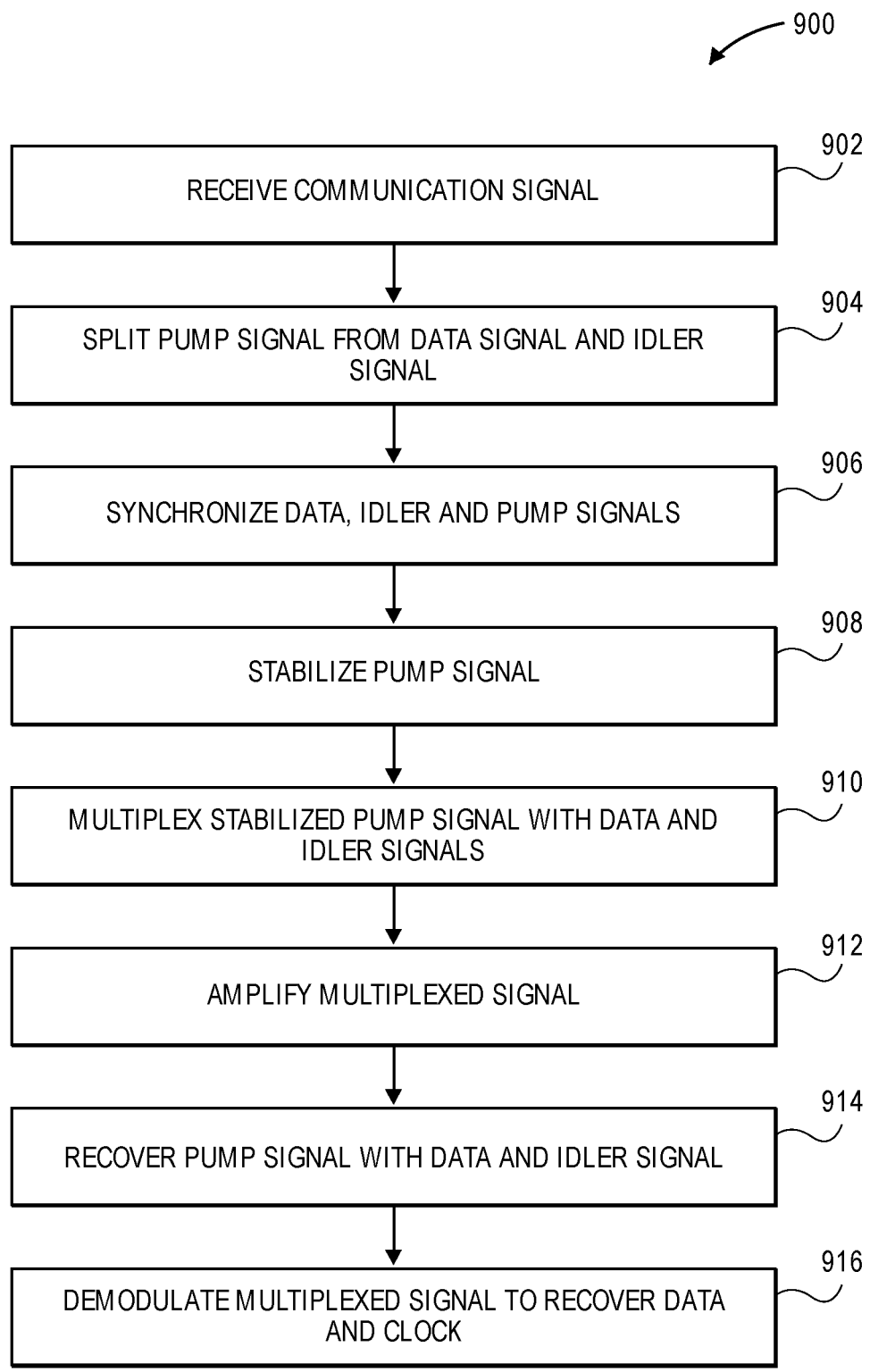
FIG. 9 illustrates a reception method, in accordance with an aspect of this patent application.

Referring now to FIGS. 7, 8, and 9, a free-space optical communication method may be implemented by carrying out a transmission method 700 or a transmission method 800 combined with a reception method 900, in accordance with an aspect of this application. That is, the reception method 900 may be implemented for either or both of the transmission method 800 and/or the transmission method 900. FIGS. 7, 8, and 9 present the transmission method 700, the transmission method 800, and the reception method 900 as flow diagrams, although these may be understood using other types of presentations in addition to or as an alternative to the flowcharts of FIGS. 7, 8, and 9, such as process and signal diagrams, graphs, code, charts, equations, timing diagrams, etc. In one aspect, one or more processes or operations in FIGS. 7 and 8 may be carried out at the transmitter 202 and the transmitter 402, respectively, in the satellite 102. Likewise, one or more processes or operations in FIG. 9 may be carried out at the receiver 600 in one or more of the ground-based receivers 104(1)-104(n). The transmission method 700 or the transmission method 800 may at least partially be implemented by executing the computer executable instructions stored in an internal memory of the satellite 102, which may be executed by a special purpose computer having a processor. Likewise, the reception method 900 may at least partially be implemented by executing the computer executable instructions stored in an internal memory of the ground-based receivers 104(1)-104(n), which may be executed by a special purpose computer having a processor.

In yet another aspect, in the transmission method 700, the transmission method 800, and the reception method 900, one or more processes or operations, or sub-processes thereof, may be skipped or combined as a single process or operation, and a flow of processes or operations in the transmission method 700, the transmission method 800, and the reception method 900 may be in any order not limited by the specific order illustrated in FIGS. 7, 8, and 9. For example, one or more processes or operations may be moved around in terms of their respective orders, or may be carried out in parallel. The term "flow," as used with respect to FIGS. 7, 8, and 9, generally refers to a logical progression of operations in an exemplary manner carried out at the satellite 102 or the ground-based receivers 104(1)-104(n). However, such a flow is by way of example only and not by way of limitation, as at a time, the flow may proceed along multiple operations or processes of the transmission method 700, the transmission method 800, and/or the reception method 900.

The transmission method 700, the transmission method 800, and the reception method 900 may be implemented using a high level or a low level programming language (e.g., C++, assembly language, etc.) using logic circuitry (e.g., programmable logic circuit (PLC), etc.) and by executing the computer executable instructions. Further, the transmission method 700, the transmission method 800, and the reception method 900 may be implemented as part of a software application, a hardware implementation, and/or combinations thereof. In one aspect, the internal memory may include a non-transitory computer readable medium on the satellite 102 and/or the ground-based receivers 104(1)-104(n). The non-transitory computer readable medium may include instructions thereupon, which when executed by respective processors cause the satellite 102 and/or the ground-based receivers 104(1)-104(n) to implement the transmission method 700, the transmission method 800, and/or the reception method 900.

Referring specifically to FIG. 7, the transmission method 700 may be implemented at the transmitter 200 of the satellite 102. The transmission method 700 may begin in an operation or step 702 where the pump signal "p" may be generated by the pump signal generator 202. The pump signal "p" may be generated at a pump wavelength by a single laser of the pump signal generator 202. Alternatively, the pump signal generator 202 may generate two separate pump signals at two different wavelengths. From the pump signal "p", the optical frequency comb 300 may be generated by the OFCG 210. To generate the optical frequency comb 300, the pump signal "p" is phase modulated by the phase modulator 204 and then passed through the polarization controller 206. A part of the pump signal "p" is then split to be sent to the OFCG 210 after suitable amplification (e.g., to ~14 dBm) by the EDFA 208. In one aspect, the amplification may not be needed in which case passing the pump signal "p" through the EDFA 208 prior to splitting may be optional. The optical frequency comb 300 may include equally space optical tones 302(1)-302(k), as illustrated in FIG. 4.

In an operation 704, the optical tones 302(1)-302(k) are split into pairs at the first array waveguide 214a. A first optical tone (e.g., the optical tone 302(1)) in the pair of optical tones is provided to the first modulator 216a and a second optical tone (e.g., the optical tone 302(2)) is provided to the second modulator 216b.

In an operation 706, the optical frequency comb 300 is modulated to generate the data signal "s" at an output of the first modulator 216a and the idler signal "i" at an output the second modulator 216b. More specifically, pairs of the optical tones 302(1)-302(k) are modulated respectively at the first modulator 216a and the second modulator 216b. For example, the first optical tone 302(1) may be modulated in-phase using the modulator driver 224a that imprints data on the first optical tone 302(1) and likewise, the second optical tone 302(2) may be modulated quadrature-phase using the modulator driver 224b that imprints data on the second optical tone 302(2), and so on for each subsequent pairs of optical tones 302(3)-302(k). In this way, the idler signal "i" and the data signal "s" are phase conjugated (90° shifted) relative to each other in the IQ modulation scheme implemented at the first modulator 216a and the second modulator 216b.

In addition, more complex modulation formats such as quadrature-phase shift keying (QPSK) combined with pulse position modulation (PPM) may be implemented using the first modulator 216a and the second modulator 216b. An advantage of using the optical frequency comb 300 is that the transmitter 200 has fewer components, thus contributing to an overall reduction in the SWaP factors of the satellite 102. Further reduction may be achieved by integrating the OFCG 210, the first array waveguide 214a, the second array waveguide 214b, the first modulator 216a, and the second modulator 216b onto an integrated chip (IC), these components being easier to integrate in an IC than traditional transmission components of a conventional satellite.

In an operation 708, in parallel to the modulation of the optical frequency comb 300, the pump signal "p" is attenuated by the variable attenuator 212. Such attenuating of the pump signal "p" is carried out to minimize the effect of the pump signal "p" on a gain of the HPOA 218 for respective wavelengths of the data signal "s" and the idler signal "i." The attenuation of the pump signal "p" may be variable and may change dynamically based on changing conditions for transmission from the satellite 102.

In an operation 710, the attenuated pump signal "p" is multiplexed with the data signal "s" and the idler signal "i" at the second array waveguide 214b. As a result, a multiplexed signal is output at the second array waveguide 214b. In an operation 712, the multiplexed signal is then provided to the HPOA 218 for amplification. Upon amplification, in an operation 714, the multiplexed signal is transmitted from the satellite 102 as the communication signal 220 to one or more of the ground-based receivers 104(1)-104(n). The communication signal 220 is transmitted as one or more of the laser beams 106 including the data signal "s", the idler signal "i", and the pump signal "p".

Referring now to FIG. 8, the transmission method 800 may be implemented at the transmitter 400 of the satellite 102. It will be appreciated by one of ordinary skill in the art that the satellite 102 may at a time have only one of the transmitter 200 or the transmitter 400 but not both to keep the SWaP for the satellite 102 low. The transmission method 800 may begin in an operation or step 802 where the data signal 508 and the pump signal 510 are generated. In one aspect, the data signal 508 and the pump signal 510 are generated separately and independently of each other in parallel. For example, the pump signal 510 is generated by the pump laser 402 and the data signal 508 is generated by the modulator 416 configured to modulate a coded and framed data from the coding and framing electronics 422 onboard the satellite 102, which is then passed through the variable optical amplifier 434. The data signal 508 and the pump signal 510 are combined by the first WDM 436 in the transmitter 400.

In an operation 804, the idler signal 512 is generated from the pump signal 510 and the data signal 508. In one aspect, the multiplexed signal at the output of the first WDM 436 is passed through the parametric amplifier 438 to generate the idler signal 512 from the data signal 508. In the parametric amplifier 438, SBS effects for the pump signal 510 are mitigated. The data signal 508 and the idler signal 512 are then separated from the pump signal 510 by the second WDM 440. The data signal 508 and the idler signal 512 are passed in the first fiber 450 and the pump signal 510 is passed in the second fiber 460.

In an operation 806, the link loss occurring due to the traversal of the communication signal 420 is compensated for. For example, the data signal 508 and the idler signal 512 may be boosted in the HPOA 418 after the idler signal 512 has been generated by the parametric amplifier 438.

In an operation 808, the pump signal 510 is attenuated by the variable attenuator 412 in order not to rob amplifier gain from the data signal 508 and the idler signal 512. Such attenuation of the pump signal 510 is carried out prior to the pump signal being provided to the third WDM 442, along with the data signal 508 and the idler signal 512. Similar to the pump signal "p," the attenuation of the pump signal 510 may be variable and may change dynamically based on changing conditions for transmission from the satellite 102.

In an operation 810, the data signal 508 and the idler signal 512 are combined with the pump signal 510 (after attenuation) at the third WDM 442. Then, in an operation 812, the combined signal is amplified by the HPOA 418. Upon amplification, in an operation 814, the combined signal is transmitted from the satellite 102 as the communication signal 420 in the form of a laser beam.

Referring to FIG. 9, the reception method 900 is illustrated in accordance with an aspect of this application. The reception method 900 may be combined with either one or both of the transmission method 700 and/or the transmission method 900 to form a free-space optical communication method. Further, such a free-space optical communication method occurring between the satellite 102 and one or more of the ground-based receivers 104(1)-104(n) may include only parts of the transmission method 700 and/or the transmission method 800 and the reception method 900. For example, some steps of transmission method 700 and/or the transmission method 800, or the reception method 900 may only be carried out once when communication between the satellite 102 and the ground-based receivers 104(1)-104(n) is initiated, disrupted, or terminated, for example.

The reception method 900 may begin in an operation 902 where one of the communication signal 220 and/or the communication signal 420 is received by telescopic optics of the receiver 600. For discussion purposes in FIG. 9, the communication signal 220 will be referred to, although one of ordinary skill in the art reading this application will appreciate that this discussion is equally applicable to the communication signal 420. Likewise, any processing of the data signal "s" and the idler signal "i" by the receiver 600 is same as that for the data signal 508 and the idler signal 512 generated by the transmitter 400. Accordingly, any discussion with respect to the data signal "s" and the idler signal "i" by the receiver 600 applies equally to the data signal 508 and the idler signal 512 when processed by the receiver 600. The communication signal 220 may be received as one of the laser beams 106 at the receiver 600 when one of the ground-based receivers 104(1)-104(n), of which the receiver 600 is part, is directly under a footprint of the satellite 102.

In an operation 904, the pump signal "p" is split from the data signal "s" and the idler signal "i" in the received communication signal 220. Such splitting is carried out by the first splitter 602, which may be a wavelength division demultiplexer, for example. The pump signal "p" upon splitting is carried over at the first output 604 of the first splitter 602 by a fiber. Likewise, the data signal "s" and the idler signal "i" at the second output 606 are carried over by another fiber to the optical processor 608.

In an operation 906, the data signal "s" and the idler signal "i" are synchronized with the pump signal "p" such that data signal "s" and the idler signal "i" have the same optical path length as the pump signal "p." Such synchronization of the path lengths may be carried out using the variable delay element 612.

In parallel with the operation 908, in an operation 908, the pump signal "p" is frequency stabilized using the photodiode 614, the loop filter 616, the slave laser 618, and the second splitter 620 feeding back into the photodiode 614. Such stabilizing of the pump signal "p" includes outputting the pump signal "p" at the steady frequency of the slave laser 618.

In an operation 910, the frequency stabilized pump signal "p" is multiplexed with the synchronized data signal "s" and the idler signal "i" at the WDM 626. In an operation 912, the multiplexed signal is input to the PSA 628 for amplification (e.g., using an HNLF). In parallel, in an operation 914, phase-locking of the pump signal "p" is carried out by the feedback loop formed using the photodiode 642 feeding back the pump signal "p" to the WDM 626 via the lock-in amplifier 644 and the piezoelectric transducer 624. Such phase-locking of the pump signal "p" ensures that a phase of the pump signal "p" is matched with a phase of the data signal "s" and is conjugated with the phase of the idler signal "i."

Finally, in an operation 916, the data signal "s" and the idler signal "i" are demodulated by the receiver 600 to extract data and clock signals originally transmitted by the satellite 102. Such demodulation may be carried out by splitting the data signal "s" and the idler signal "i" at the WDM 648 and using the first demodulator 652a for the data signal "s" and the second demodulator 652b for the idler signal "i." The operation 916 may include individually converting the data signal "s" and the idler signal "i" into equivalent digital signals after demodulation for processing by the DSP 658, and decoding and frame removal by the decoding and de-framing electronics 668.

Advantageously, various aspects of this application make the bus power draw of the transmitter 200 and the transmitter 400 lower. By using modulation-demodulation techniques in which pulse position modulation is combined with quadrature phase shift keying, the receiver 600 requires fewer photons per bit of data in the communication signal 220 or the communication signal 420. This can reduce bus power draw by as much as 50% for the transmitter 200 and the transmitter 400 leading to a lighter weight for the HPOA 218 and the HPOA 418 in the transmitter 200 and the transmitter 400, respectively, and hence a smaller for the satellite 102. An exemplary comparison of the aspects of this application in terms of bus power draw with respect to conventional receivers and transmitters is presented in Table I.

TABLE I

| Parameter | Conventional Phase Insensitive Amplifier with Intradyne LNA receiver | Receiver 600 with optical phase-locking and PSA |
| --- | --- | --- |
| Noise Figure NF (dB) | 3 | 0 |
| Bus Draw for HPOA | 100 W | 50 W |

TABLE I-continued

| Parameter | Conventional Phase Insensitive Amplifier with Intradyne LNA receiver | Receiver 600 with optical phase-locking and PSA |
|---|---|---|
| Preamplifier Bus Draw | 2 W[1] | 25 W[2] |

[1]Based on EMCORE ® 1014-PA with 14 dBm output, NF = 3.3 dB.
[2]Based on EMCORE ® 3030 with 30 dBm output, NF ~5 dB.

As understood from Table I above, instead of using a low-noise amplifier (LNA), as is conventional in receivers on ground, this application introduces use of the PSA 628 having a quantum limit of 0 dB on noise figure in the receiver 600, 3 dB lower than phase insensitive amplifiers. This 3 dB improvement in noise figure translates directly to a drop in the power required from the transmitter 200 and/or the transmitter 400.

The present description is for illustrative purposes only, and should not be construed to narrow the breadth of the present patent application in any way. Thus, those skilled in the art will appreciate that various modifications might be made to the presently disclosed embodiments without departing from the full and fair scope and spirit of the present application. Other aspects, features and advantages will be apparent upon an examination of the attached drawings and appended claims.

What is claimed is:

1. A method, comprising:
generating an optical frequency comb comprising a first tone and a second tone different from the first tone;
modulating, by a first modulator of a first device, the first tone to generate a first signal comprising data;
modulating, by a second modulator of the first device, the second tone to generate a second signal that is a phase conjugate of the first signal; and
transmitting, via free-space and to a second device, a communication signal having the first signal and the second signal.

2. The method of claim 1, further comprising splitting the first tone from the second tone in the optical frequency comb prior to modulating the first tone and the second tone.

3. The method of claim 2, further comprising multiplexing the first signal and the second signal to produce the communication signal.

4. The method of claim 1, further comprising amplifying the communication signal prior to the transmitting the communication signal.

5. The method of claim 1, wherein the first tone and the second tone comprise frequencies that are equally spaced from a frequency of a pump signal.

6. The method of claim 1, wherein the first tone is modulated using in-phase modulation and the second tone is modulated using quadrature phase modulation.

7. The method of claim 1, further comprising:
generating a pump signal;
splitting the pump signal into a first portion used to generate the optical frequency comb and a second portion;
attenuating the second portion of the pump signal; and
multiplexing the attenuated second portion of the pump signal with the first signal and the second signal to generate the communication signal.

8. A device comprising:
one or more processors; and
memory storing instructions that, when executed by the one or more processors, cause the device to:
cause output of an optical signal, wherein an optical frequency comb is generated based on the optical signal and comprises a first tone and a second tone different from the first tone;
modulate, by a first modulator of the device, the first tone to generate a first signal comprising data; and
modulate, by a second modulator of the device, the second tone to generate a second signal that is a phase conjugate of the first signal, wherein a communication signal comprising the first signal and the second signal is output via free space.

9. The device of claim 8, wherein the first tone is split from the second tone in the optical frequency comb prior to modulating the first tone and the second tone.

10. The device of claim 8, wherein the first signal and the second signal are multiplexed to produce the communication signal.

11. The device of claim 8, wherein the communication signal is amplified prior to the transmitting the communication signal.

12. The device of claim 8, wherein the first tone and the second tone comprise frequencies that are equally spaced from a frequency of the optical signal.

13. The device of claim 8, wherein the first tone is modulated using in-phase modulation and the second tone is modulated using quadrature phase modulation.

14. The device of claim 8, wherein the optical signal is split into a first portion used to generate the optical frequency comb and a second portion, wherein the second portion is attenuated and the attenuated second portion is multiplexed with the first signal and the second signal to generate the communication signal.

15. A non-transitory computer-readable medium storing computer-executable instructions that, when executed by one or more processors, cause:
modulating, by a first modulator of a first device, a first tone to generate a first signal comprising data; and
modulating, by a second modulator of the first device, a second tone to generate a second signal that is a phase conjugate of the first signal, wherein the first tone and the second tone are separate tones and from an optical frequency comb, and wherein a communication signal comprising the first signal and the second signal is transmitted via free space to a second device.

16. The non-transitory computer-readable medium of claim 15, wherein the first tone is split from the second tone in the optical frequency comb prior to modulating the first tone and the second tone.

17. The non-transitory computer-readable medium of claim 16, wherein the first signal and the second signal are multiplexed to produce the communication signal.

18. The non-transitory computer-readable medium of claim 15, wherein the first tone and the second tone comprise frequencies that are equally spaced from a frequency of a pump signal.

19. The non-transitory computer-readable medium of claim 15, wherein the first tone is modulated using in-phase modulation and the second tone is modulated using quadrature phase modulation.

20. The non-transitory computer-readable medium of claim 15, wherein the instructions, when executed by one or more processors, further cause generating a pump signal, wherein the pump signal is split into a first portion used to generate the optical frequency comb and a second portion, and wherein the second portion is attenuated and the attenuated second portion is multiplexed with the first signal and the second signal to generate the communication signal.

\* \* \* \* \*